July 6, 1965  D. A. MORETON  3,193,175
CARTONS OR BOXES
Filed May 13, 1963  10 Sheets-Sheet 1

July 6, 1965 D. A. MORETON 3,193,175
CARTONS OR BOXES
Filed May 13, 1963 10 Sheets-Sheet 2

July 6, 1965 D. A. MORETON 3,193,175
CARTONS OR BOXES
Filed May 13, 1963 10 Sheets-Sheet 3

United States Patent Office 3,193,175
Patented July 6, 1965

3,193,175
CARTONS OR BOXES
Douglas Arthur Moreton, Chellaston, England, assignor to Bemrose & Sons Limited, Derby, England
Filed May 13, 1963, Ser. No. 280,022
Claims priority, application Great Britain, May 21, 1962, 19,521/62; May 30, 1962, 20,912/62
3 Claims. (Cl. 229—31)

This invention relates to cartons or boxes of the kind that can be completely closed and are made from single blanks of cardboard, paperboard, or other foldable material. The invention is concerned with, but not limited to, boxes formed from flat blanks without the aid of rivets, staples, or the insertion of tabs through slits cut in walls or panels. However, the invention is also applicable to cartons having means, other than the frictional engagement between parts of the carton, for maintaining the carton in the closed condition. Thus, a mechanically locking slit and tab arrangement may be provided on the front walls of the tray and lid, or alternatively heat-sealing or gluing may be used.

One form of carton to which the invention may advantageously be applied is the paperboard or cardboard container for frozen or dehydrated food. In this case, the absence of any pin-holes (i.e. tiny openings at three-dimensional corners formed by walls or panels folded at an angle to one another and by overlapping tabs) is highly desirable to enable an unwrapped carton to be provided which prevents or minimises the seepage or passage of odour, moisture-vapour, or other deleterious conditions which might biologically affect the contents. In this case, the carton is preferably kept closed by heat-sealing, a thermo-plastic coating being put down overall or selectively on the inside or outside surface, or both surfaces, of the carton, and the closure being made by the application of heat and pressure.

The practical avoidance of cut slits or slots in the carton walls eliminates the necessity for wrapping the carton, and any information or advertising matter can be printed directly on the carton instead of on the wrapper. An object of the invention is, therefore, to provide blanks that can be folded or bent into closed cartons and are cut from sheet or web that has previously been printed with the legend that is to appear on each carton.

Another, and extremely important, object of the invention is to provide carton blanks that can be cut from a web or sheet without the necessity for removing any waste material whatsoever. This permits the production of cartons from a continuous spool or reel without the ragged or irregular edges that would be present if portions of the paperboard or other material had to be separated from the blanks. The absence of waste is particularly valuable when the cartons are severed from web printed by a rotary printing process (e.g. intaglio or gravure, web-fed letter-press, or web offset, employing cylindrical plates with minimum circumferential margins) as it eliminates the need for waste removal mechanism on these fast running rotary machines.

This absence of waste makes possible a further advantage, in that it enables the cutting off of the individual blanks, as well as such creasing and slotting as is necessary, to be effected on the packaging machine. The possibility of creasing and cutting each individual blank on the same die in the packaging machine ensures uniformity. Moreover, the necessity for storing blanks before they reach the packaging machine is eliminated. This is advantageous in that the creases in stored cartons are apt to lose some of their characteristics.

According to the invention, a blank to be folded into a carton or box consists of a flat sheet creased, scored or otherwise weakened along lines such that it can be folded into a rectangular, closed box or carton having lid and tray panels joined by a back wall, and having overlapping side walls and means for closing the front of the carton or box, the blank incorporating gussets so arranged in relation to other portions of the blank that, when the container or box is formed, there is no pin-hole at any one of at least six of its corners, four of these being at the back of the carton. It is to be understod that the terms "front," "back" and "sides" are used in this specification primarily to indicate the relative positions of the parts. Clearly the cartons or boxes may be used in various positions, depending to some extent on their proportions; for example, with the "front" at the top.

In many applications of the invention, it is very convenient to arrange the gussets so that there is no pin-hole at any one of all eight corners of the box.

To eliminate the pin-holes at the back of the carton or box, the blank may be provided, on each side, with three essentially triangular gussets, joined to one another and extending from the free edge of the back wall and from the two adjacent edges of the side walls. Where the blank is to be severed without waste, the triangular notch, that would normally lie between the two gussets extending from the side walls, may be filled by a triangular extension of one of the gussets.

Where there are to be no pin-holes, the front of the tray, as well as the front of the lid, may have a front wall that is joined to the front edges of the two sides of the tray or lid, on both sides, by pairs of gussets that can be folded to form pleats in the formed carton or box. Then, it is convenient so to form the gussets that the side edges of the front wall are bevelled so as to make the front wall easy to tuck between the lid front wall and the adjacent gussets of the lid, when the carton is being closed.

In an alternative which provides a carton that is particularly suitable for packing pastries, the front edges of the tray side walls are furnished with tabs arranged to be folded inwards towards one another to lie behind the front wall of the tray in the formed carton or box, the edges of the tabs being disconnected from the front wall. This provides a carton with only six pin-hole free corners, but when the front wall of the tray is inserted between the lid front wall and the gussets associated with the lid front wall, a reasonably satisfactory seal is obtained at the front corners of the tray.

In another carton, the front wall and gussets at the front of the lid are omitted, and the top of the front wall of the tray is provided with a rearward extension which is sealed to the lower face of the main lid panel. In this carton pin-hole free front corners are provided by two sets of three gussets similar to those described above for the back of the carton. Each set of these three gussets provides a junction between the forward edge of the adjacent tray side wall, the adjacent edge of the tray front wall and a tab constituting a lateral extension of the said rearward extension.

In order that the invention may be clearly understood and readily carried into effect, carton blanks and cartons in accordance therewith will now be described, by way of example, with reference to the accompanying drawings in which.

Figures 1, 2:
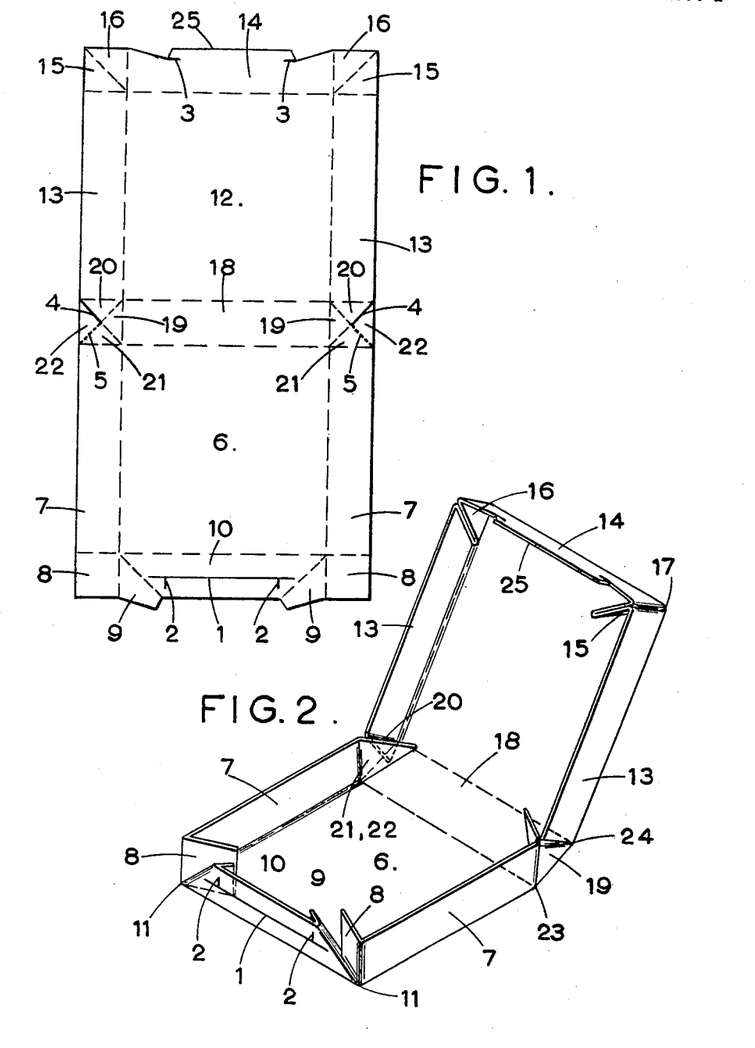
FIGURE 1 is a plan of a blank.
FIGURE 2 is a perspective view of the blank of FIGURE 1 when partly folded into a carton.

The blank shown in FIGURE 1 is creased along the broken lines. It is slit along the full lines 1, 2, 3, 4. The dotted lines 5 are inserted for the purpose of explanation and do not represent any physical feature. It will be seen that the ends of the carton, appearing at top and bottom of FIGURE 1, are complementary in shape, so that the blanks of FIGURE 1 can be cut in succession from a web without any waste material being left over.

The tray portion of the blank comprises a main panel 6 with lateral margins 7 that are folded upwards to provide side walls as shown in FIGURE 2. The forward ends of the margins 7 are extended by rectangular gussets 8 which are connected by essentially triangular gussets 9 to a front margin 10, which is formed with the slits 1, 2 for a purpose to be described below. The front margin 10 is folded vertically upwards to provide a front wall for the tray while the pairs of gussets 8, 9 are folded inwards to provide pleats (FIGURE 2) joining the front wall 10 with the side walls 7. It will be seen that this is done without forming any pin-holes at the corners 11.

The lid portion of the blank comprises a main panel 12 with lateral margins 13 and a front margin 14 joined at its sides by triangular gussets 15, 16 to the lateral margins 13. The margins 13, 14 are bent at right angles to the main panel 12 while each pair of gussets 15, 16 is folded inwards to form a tuck (FIGURE 2). Thus, the formation at the front corners 17 of the lid is such that there are no pin-holes at these corners.

The main panel 6 of the tray and the main panel 12 of the lid are joined by a back panel 18 which is at right angles to the two panels 6, 12 when the carton is closed. At each side of the back panel 18, its edge is co-extensive with the base of a triangular gusset 19. Triangular gussets 20 are interposed between the gussets 19 and the adjacent ends of the side wall panels 13 of the lid. The space between each pair of gussets 19, 20 and the end of the adjacent side wall panel 7 of the tray is filled in by a triangular piece 21, 22 which may be regarded as a triangular gusset 21 with a triangular extension 22. These two parts 21, 22 are, however, never folded together along the imaginary line 5. When the carton is completely closed, the three gusset elements 19, 20 and 21, 22, on each side, are packed together in a flat pack against the back wall 18, with the gusset 19 against the wall 18 and the gusset 20 between the gusset 19 and the triangular piece 21, 22. With this arrangement there are no pin-holes either at the rear corners 23 of the tray or at the rear corners 24 of the lid. Moreover, the triangular extensions 22 of the gussets 21 increase the compressive strength of the back of the completed carton.

Figure 3:
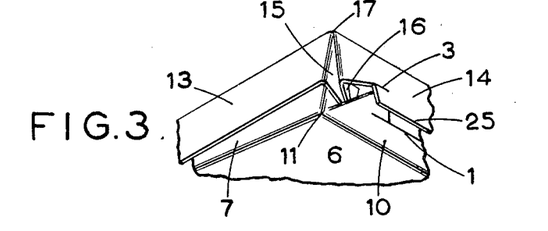
FIGURE 3 is a perspective view of the blank of FIGURE 1 when nearly completely folded into a carton.

To close the carton, the front wall 10 and adjacent gussets 9 of the tray are tucked between the front wall 14 of the lid and the adjacent gussets 16, as shown in FIGURE 3. This is facilitated by the tapering of the front wall 10 due to the shape of the gussets 9.

Figure 4:
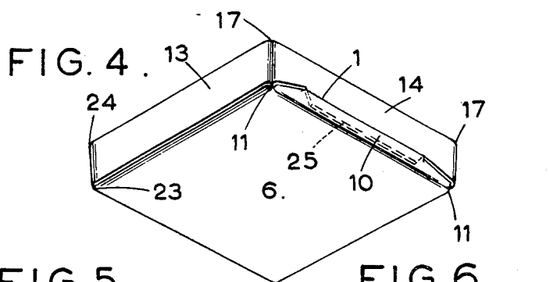
FIGURE 4 is a perspective view of the blank of FIGURE 1 when completely folded into a carton.
Figure 5:
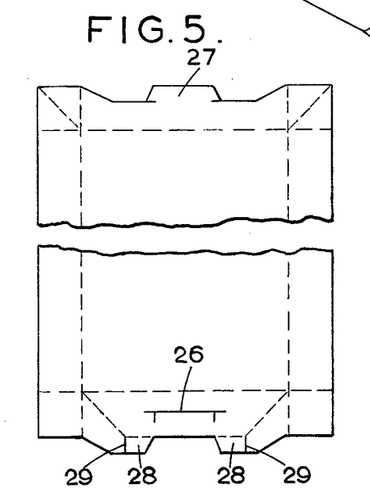
FIGURES 5 and 6 are plans of two further blanks.
Figure 6:
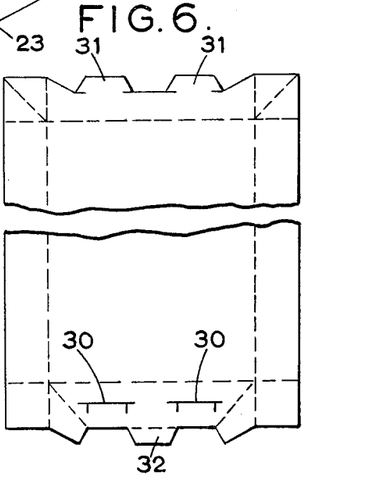

The closed carton is shown in FIGURE 4 and it will be seen that a tab 25 on the lid has been tucked through the slit 1. The portions of the tab 25 adjacent the slits 3 and portions of the tray front wall 10 outside the slits 2 can be made to interlock and prevent the carton from being opened without tearing. Either in addition to or in place of this tab and slit closure, the carton may be glued shut along one or more of its three sides, or a thermo-plastic coating may be put down over all or selectively on the inside or outside surface of the carton, and the closure made by the application of heat and pressure. The thermoplastic adhesive may be polyethylene, polypropylene, polyvinylidene chloride or its copolymers, wax or wax blends, or wax and resinous blends incorporating a copolymer of ethylene and vinyl acetate in suitable proportions.

Where a long slit 1 is employed, as in the carton of FIGURES 1 to 4, the portion of the wall 10 beneath the slit 1 tends to sag outwards. To avoid this, the blanks of FIGURES 5 and 6 may be employed. Each of these has complementary ends so that it can be cut in series from a web without waste. In FIGURE 5 there is a comparatively short slot 26 that receives a corresponding tab 27. This involves two superfluous tabs 28 which are simply folded inwards on the completed carton, slits being provided at 29. In FIGURE 6 there are two slits 30 and two tabs 31, a single superfluous tab 32 to be folded inwards being a consequence of this arrangement.

It will be seen that the gussets 19, 20, 21 in FIGURES 1 to 6 are defined by diagonals of a square and, therefore, have apices that are right angles. This results in slightly bulging folds at the back of the closed carton, due to the fact that all three gussets try to occupy the same flat plane. This small unsightliness can be eliminated by replacing each slit 4 by a slightly flared slit, such as a slit along the chain line 33 in FIGURE 7, which cuts a small corner of the adjacent side wall 13. This expedient also reduces the risk of friction or binding occurring between portions of the blank at the back of the container while it is being folded.

Where it is unnecessary to cut the blanks from a web without waste, the triangular extensions 22 of the gussets 21 can be omitted, so that a triangular notch 34 (FIGURE 8) is present on each side of the blank. In this case, the aforesaid bulging, and friction or binding on folding, can be avoided either by making the angle of each notch 34 less than a right angle, as indicated by chain lines 35, or by flaring the notch 34 on one or each side, as indicated by chain lines 36, so as to cut off a small corner of the adjacent side wall.

Figure 9:
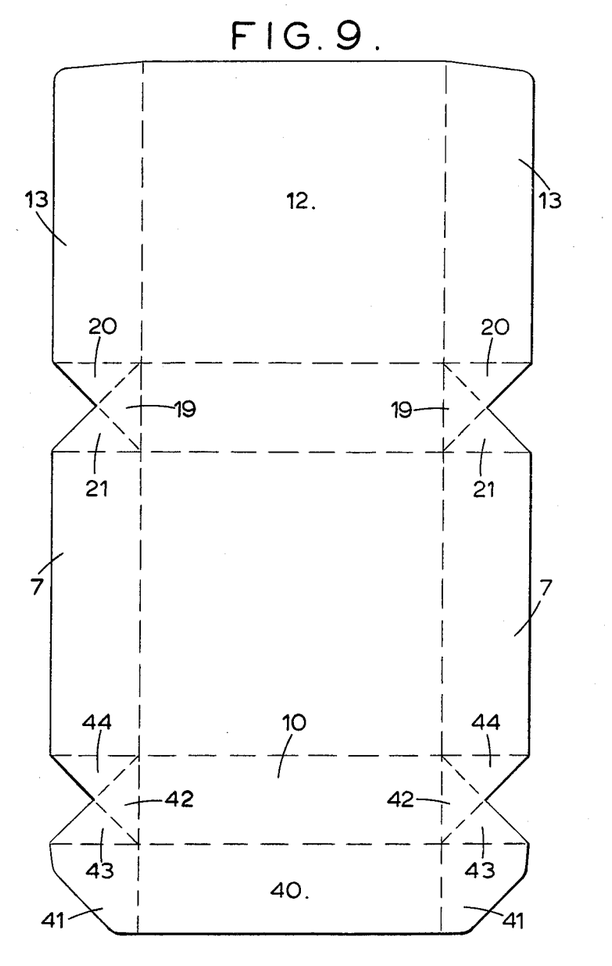
FIGURE 9 is a plan of another blank.
Figure 10:
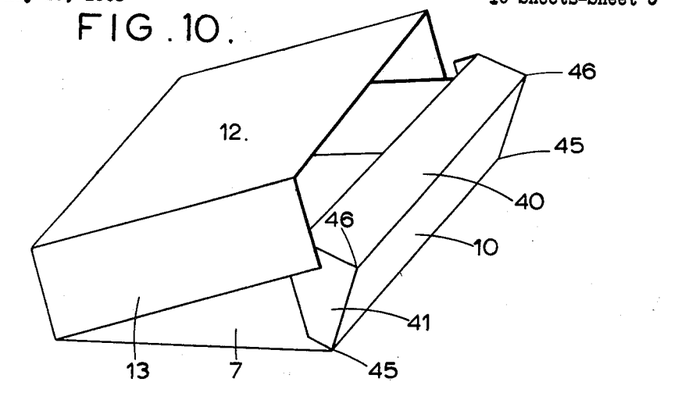
FIGURE 10 is a perspective view showing the blank of FIGURE 9 partly folded into a carton.

Referring now to FIGURES 9 and 10, it will be seen that the front wall of the lid has been omitted and that the front wall 10 of the tray is furnished with an extension panel 40 which, when the carton is constructed, is bent back at right angles to the front wall 10 and is heat sealed to the forward position of the underside of the main lid panel 12. The extension panel 40 has lateral tabs 41 and each of these is connected to the adjacent end of the tray front wall 10 and of the tray side wall 7 by three gussets 42, 43, 44. These are similar to the gussets 19, 20, 21 at the back of the carton and fold in the same way, thus providing pin-hole free corners 45, 46 at the front of the carton. Clearly the blank of FIGURE 9 is not one that can be cut from a web without waste.

In addition to the heat seal between the rearward extension 40 and the main lid panel 12, the side walls 13 of the lid are sealed to the side walls 7 of the tray and to the tabs 41. The tabs 41 are also sealed to the side walls 7 of the tray. This results in a carton of great strength. During the folding of the carton, sealing or caulking material such as wax, wax-blend or hot-melt composition, may be inserted at the apices of each set of three gussets 19, 20, 21 and 42, 43, 44, the insertion being effected by jet or spray.

In a modification of the arrangement of FIGURE 10 the tabs 41 extend along the inside surfaces of the tray side walls 7. It is also to be noted that the lengths of the tabs 41 can be extended to such an extent that they are co-extensive with substantially the whole of the tray side walls 7. The extension panel 40 may also be extended so as to be co-extensive with the lid main panel 12.

Figure 11:
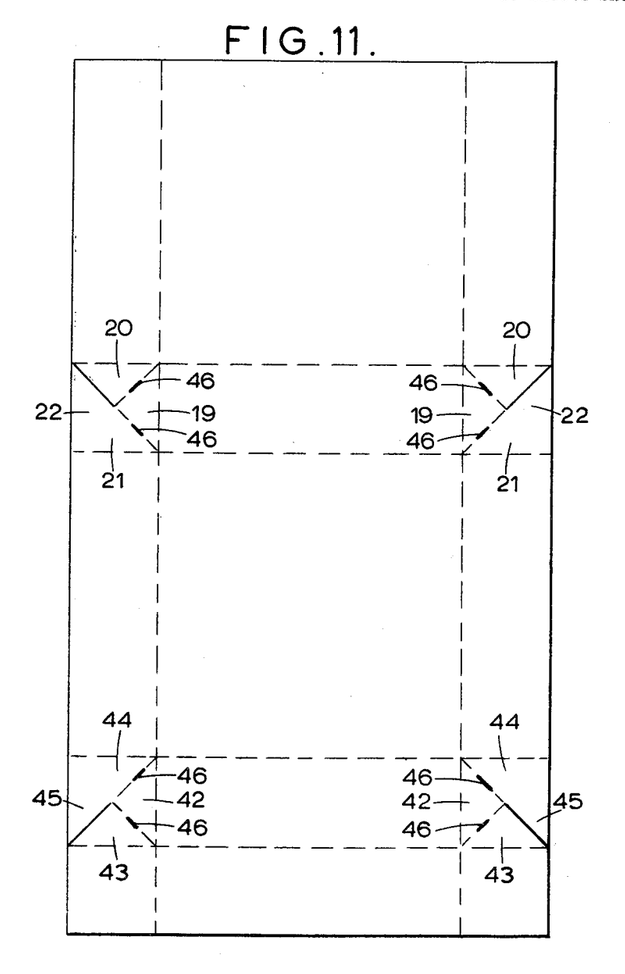
FIGURES 11 and 12 are plans of two further blanks.

FIGURE 11 shows a blank which is a modification of that of FIGURE 9, and is formed so that a series of similar blanks can be cut in succession from a web without waste. Thus, each gusset 21 or 44 is furnished with a triangular extension 22 or 45 that fills up the adjacent notch at the edge of the blank. Moreover, each blank is a simple rectangular sheet. The gusset areas 19, 20, 21, 22 and 42, 43, 44, 45 may all be modified in the ways suggested above with reference to FIGURE 7, or, where the extensions 22, 45 are omitted, as described with reference to FIGURE 8.

The creases or the like between the gussets 19, 20, 21 and between the gussets 42, 43, 44 are at re-entrant folds; that is to say, they have to be folded against the crease and, to enable this to be done, slits 46 are provided along these creases. As an alternative to these slits, reverse creasing techniques may be employed. Where the carton has an inside plastic coating, the slits 46 should not penetrate the blank completely, but should stop short at the coating. These slits 46 may, of course, be applied to the various other blanks particularly described in this specification. Moreover, they can, if required, be applied to the non-re-entrant folds.

Figure 12:
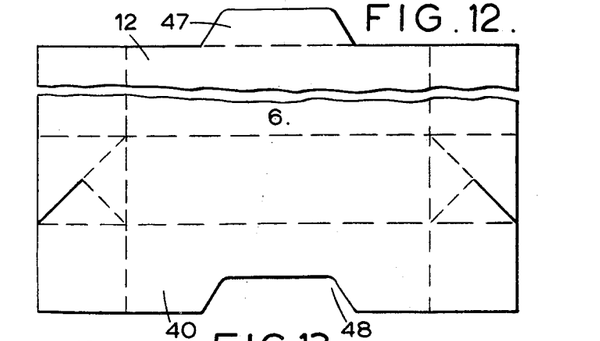

FIGURE 12 shows a modification of FIGURE 11, in which a tab 47 projects from the main panel 12 of the lid. In the completed carton this is folded round beneath the bottom of the tray and may be heat sealed thereto. These blanks are cut from the web without waste, so that notches 48 appear in the extension panels 40. The tab 47 may, if desired, extend the entire width of the carton and, when sealed thereto, provide substantial additional strength at the front. In this case the tab 47 may extend the entire width of the carton blank so that there is then nothing equivalent to the notch 48.

Figure 13:
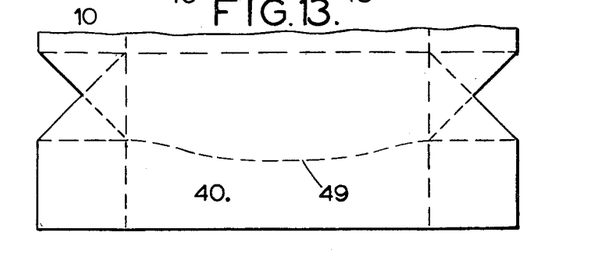
FIGURE 13 is plan of one end of another blank.

FIGURE 13 shows a modification in which a curved crease 49 is provided between the front panel 10 and the extension panel 40. The effect of this is that, when these two panels are folded at right angles to one another, greater purchase is provided for the sealing of the main lid panel to the panel 40; that is to say, the panel 40 will not yield so readily to pressure.

Figure 14:
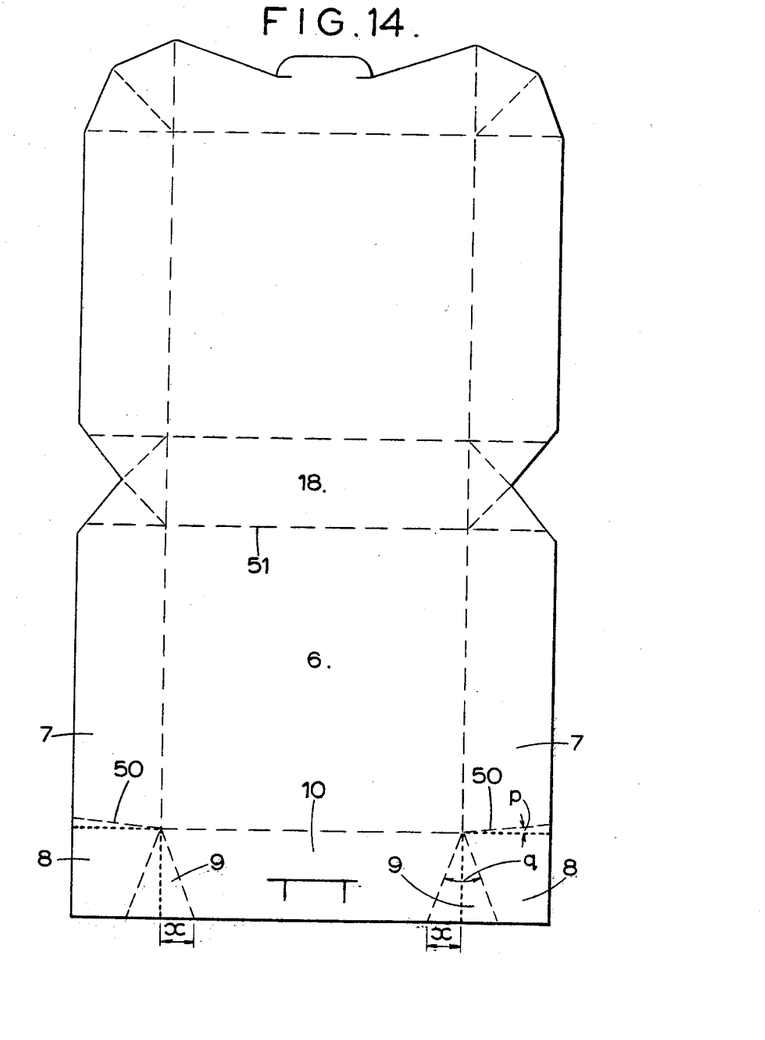
FIGURES 14 and 15 are plans of yet other blanks.

Referring now to FIGURE 14, it will be seen that this shows an arrangement in which the shape of the gussets 8, 9 is modified. In particular, the creases 50, between the gussets 8 and the side walls 7, have a fall back angle $p$, which is chosen according to the depth of the carton. The reason for this is to enable the lid easily to clear the forward top corners of the side walls 7, when the carton is closed in a machine that causes the lid, in a nearly fully formed condition, to close by turning primarily about the crease 51 between the main panel 6 and the back panel 18. The angle of bevel or taper of the front wall 10 is chosen arbitrarily by selecting the length $x$ on each side. Then the angle $q$ at the apex of the gusset 9 is made equal to $45° + \frac{1}{2}p$.

Figure 15:
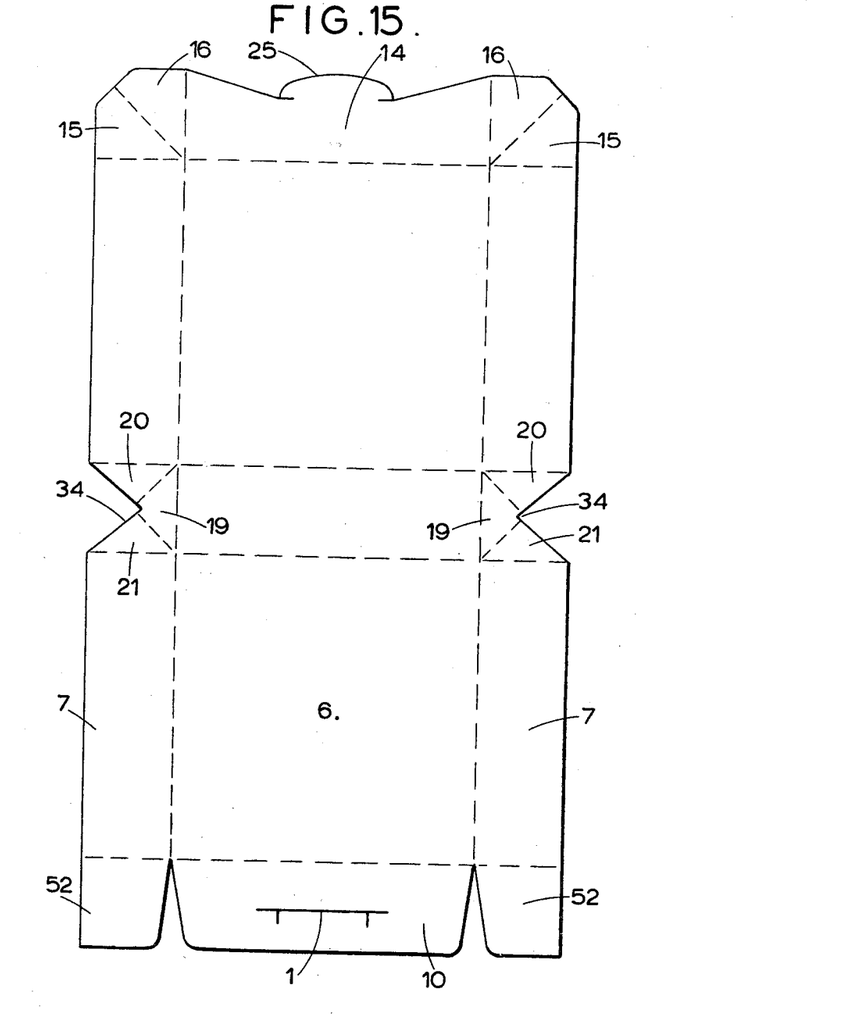
Figure 16:
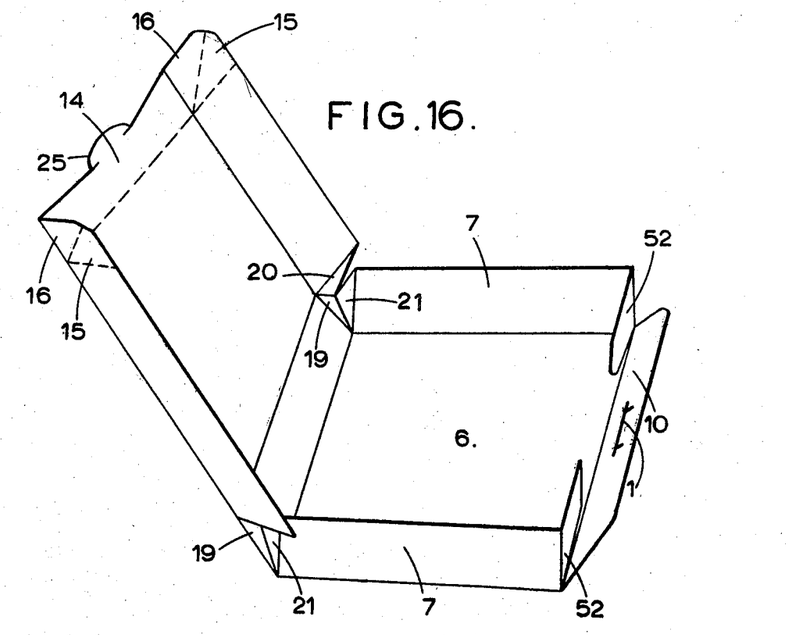
FIGURE 16 is a perspective view of a portion of the blank of FIGURE 15 when partly folded into a carton.
Figure 17:
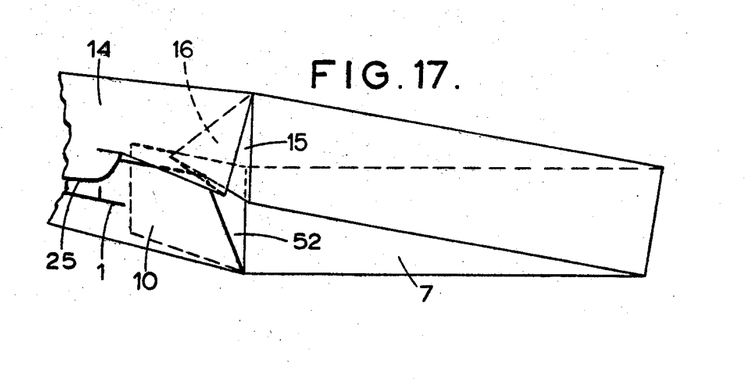
FIGURE 17 is a perspective view of a portion of the blank of FIGURE 15 when nearly completely folded into a carton.

In the carton of FIGURES 15 to 17, the gussets 8, 9 have been replaced by tabs 52 at the forward edges of the side walls 7. These tabs 52 are bent toward one another, at right angles to the walls 7, when folded as shown in FIGURE 16. The bevelled side edges of the front wall 10 are disconnected from the tabs 52, and when the wall 10 is bent upwards at right angles to the panel 6, it overlaps the tabs 52. When the carton is closed, the front wall 10 of the tray is inserted between the front wall 14 of the lid and the front gussets 16, as shown in FIGURE 17. Moreover, the lid tab 25 is tucked through the slit 1 in the front wall 10 of the tray as described above with reference to FIGURES 1 and 4. In this connection, it is to be understood that, in the absence of any further closure means, it is very easy to open the carton simply by inserting a finger through the slit 1, in front of the tab 25, and tearing the wall 10, beneath the slit 1, downwards. The wall 10 may be weakened along vertical lines extending downwards beneath the ends of the slit 1, to facilitate this.

It will be seen that in the carton of FIGURES 15 to 17, all pin-holes are eliminated at the rear corners of the carton and at the front corners of the lid. Pin-holes do exist at the front corners of the tray, but the packing of the gussets 15 between the tabs 3 and front wall 10 substantially provides the effect of complete closures at these corners.

Either in addition to or in place of the closure provided by the tab 25 and slit 1, the carton may be sealed under heat and pressure along the sides and front through the medium of a thermo-plastic coating as aforesaid. In this case, when the tab and slit are not used, the front wall 10 of the tray may be heat sealed over the front wall 14 of the lid.

Figures 7, 8:
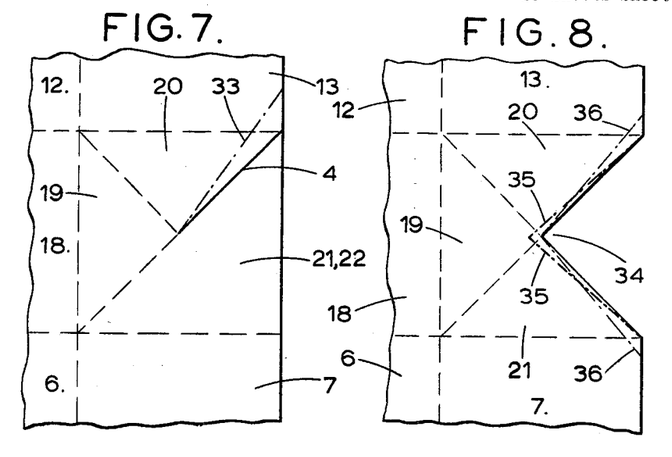
FIGURES 7 and 8 are plans of details, on an enlarged scale.
Figure 18:
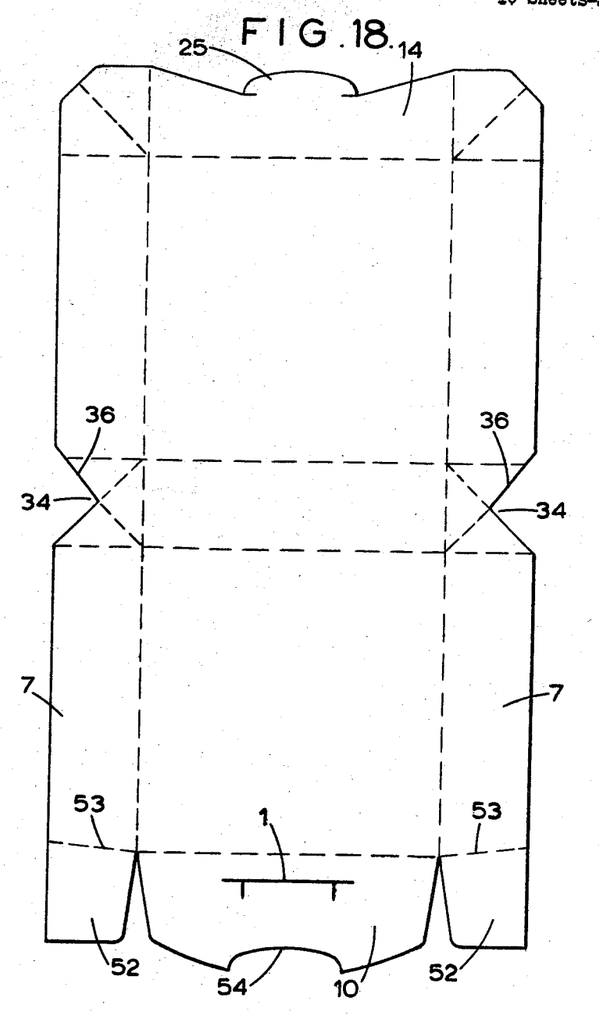
FIGURES 18 and 19 are plans of further blanks.

FIGURE 18 shows a modification of the blank of FIGURE 15, in which the creases 53 between the tabs 52 and the side walls 7 have a fall back angle for the reason already mentioned with reference to FIGURE 14. Moreover, the front wall 10 is formed with a recess 54 that enables the tab 25 to approach and enter the slit 1 without fouling the free edge of the wall 10, when the carton is being closed. The shape of the free edge of the wall 10 also has the advantage that it closely matches the free edge of the front wall 14 of the lid, so that successive blanks can be cut from a web with but little waste between them. A further difference between FIGURES 15 and 18 is that each notch 34 in FIGURE 18 has a flared edge 36 instead of the other form of notch shown in FIGURE 8, namely an acute apex. Of course, in the blanks of FIGURES 15 and 18, a gusset arrangement as shown in FIGURE 7 may be employed as an alternative.

Figure 19:
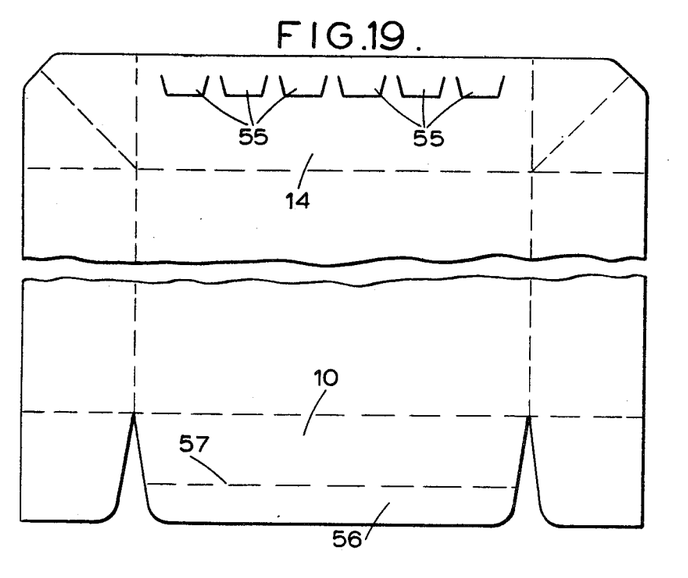

FIGURE 19 shows an arrangement in which the tray front-wall 10 is to be heat-sealed to the front of the lid front wall 14. In this case, therefore, a series of small tabs 55 may be cut within the ambit of the lid front wall 14, and a tab 56 may be provided along the edge of the wall 10. A crease 57 divides the tab 56 from the portion of the tray front wall 10 that is heat sealed to the front of the lid front wall 14. To open the carton, the tab 56 is pulled upwards and forwards, thereby causing the wall 10 to tear the tabs 55 to the bottom edge of the wall 14 and, therefore, off the wall 14. In the alternative arrangement where the wall 10 is tucked inside the wall 14 as shown in FIGURE 17, the small tabs, such as 55, are provided on the wall 10.

Referring once more to FIGURES 14 and 18, the fall back angle of the creases 50 and 53, respectively appearing in these figures, is chosen to suit the required configuration of the box. The formula given in relation to the angle $q$ in FIGURE 14 gives a three dimensional right angle configuration when the box is erected, but the angles can be varied slightly if, for any reason, a configuration other than a right angular one is required.

It will be appreciated that the plans of blanks in the drawings are essentially drawn to scale, having regard to the shapes of the cartons required. However, it may be mentioned that the curve of the crease 49 in FIGURE 13 is greatly exaggerated.

The tabs 52 shown in FIGURES 15 to 18 may be omitted.

In addition to the various forms of adhesive and the heat-sealing mentioned above the securing the lids to the trays of the cartons, it is possible to use either glue or cohesive cold sealing. Where glue or heat-sealing is used, it is not possible to slit the walls of the blank. Thus, for example, in the case of FIGURE 4, the tab 25 is sealed to the outside surface of the front wall 10.

Where notches, such as the notches 34, are provided in the sides of the blank, they can be used to locate the blank in the machine by which the cartons are folded and closed.

I claim:

1. A closed box formed by folding a single flat blank having weakened lines thereon, said box including a lid panel, a tray panel, a back wall joining said lid and tray panels, side walls on each side of said tray panel, side walls on each side of said lid panel overlapping said first-mentioned side walls, three essentially triangular gussets on each side and interposed between said back wall and said side walls to provide pin-hole free corners at all four back corners of the box, a front wall on said tray panel, a front wall on said lid panel overlapping said tray front wall, two gussets on each side interposed between said tray front wall and the adjacent tray side wall, and two gussets on each side interposed between said lid front wall and the adjacent lid side wall, whereby pin-hole free corners are provided at all four corners of the box, said tray front wall and adjacent tray gussets being tucked between said lid front wall on the one hand and the adjacent lid gussets on the other hand.

2. A closed box formed by folding a single flat blank having weakened lines thereon, said box including a lid panel, a tray panel, a back wall joining said lid and tray panels, side walls on each side of said tray panel, side walls on each side of said lid panel overlapping said first-mentioned side walls, three essentially triangular gussets on each side and interposed between said back wall and said side walls to provide pin-hole free corners at all four back corners of the box, a front wall on said tray panel, a front wall on said lid panel overlapping said tray front wall, two gussets on each side interposed between said lid front wall and the adjacent lid side wall, whereby pin-hole free corners are provided at the front corners of the lid, and tabs extending respectively from the two front edges of said tray side walls, the edges of said tabs being separate from said tray front wall, said tray front wall being inserted between said lid front wall and said gussets associated with said lid front wall, and said tabs being folded towards one another and lying behind said gussets associated with said lid front wall.

3. A closed box formed by folding a single flat blank having weakened lines thereon, said box including a lid panel, a tray panel, a back wall joining said lid and tray panels, side walls on each side of said tray panel, side walls on each side of said lid panel overlapping said first-mentioned side walls, three essentially triangular gussets on each side and interposed between said back wall and said side walls to provide pin-hole free corners at all four back corners of the box, a front wall on said tray panel, a front wall on said lid panel overlapping said tray front wall, two gussets on each side interposed between said lid front wall and the adjacent lid side wall, whereby pin-hole free corners are provided at the front corner of the lid, said tray front wall having side edges, said side edges being tapered to facilitate entry of the tray front wall between the lid front wall and the adjacent lid gussets, and said tray front wall being inserted between said lid front wall and said gussets associated with said lid front wall.

References Cited by the Examiner

UNITED STATES PATENTS

| | | | |
|---|---|---|---|
| 1,135,588 | 4/15 | Kendrick | 229—45 |
| 1,230,675 | 6/17 | Cole | 229—31 |
| 1,793,102 | 2/31 | Labombarde | 229—44 |
| 2,002,005 | 5/35 | Gottlieb | 229—451 |
| 2,097,708 | 11/37 | Trost | 229—33 |
| 2,846,132 | 8/58 | Carpenter | 229—31 |
| 2,865,549 | 12/58 | Inman | 229—33 |
| 2,914,234 | 11/59 | Hazelwood | 229—31 |
| 3,029,997 | 4/62 | Kauffeld | 229—37 |

FRANKLIN T. GARRETT, *Primary Examiner.*